US00RE39692E

(19) United States
(12) Reissued Patent
Cheshire

(10) Patent Number: US RE39,692 E
(45) Date of Reissued Patent: Jun. 12, 2007

(54) SOCKET CONNECTOR HAVING A FLEXIBLE INTERNAL BARRIER TO PREVENT INCORRECT INSERTION OF SMALLER SIZED PLUGS

(75) Inventor: Stuart D. Cheshire, San Jose, CA (US)

(73) Assignee: Apple Inc., Cupertino, CA (US)

(21) Appl. No.: 10/367,627

(22) Filed: Feb. 13, 2003

Related U.S. Patent Documents

Reissue of:
(64) Patent No.: 6,186,835
Issued: Feb. 13, 2001
Appl. No.: 09/337,067
Filed: Jun. 21, 1999

(51) Int. Cl.
*H01R 24/00* (2006.01)

(52) U.S. Cl. ..... 439/676; 439/677
(58) Field of Classification Search ..... 439/676, 439/677, 680, 344
See application file for complete search history.

(56) References Cited

U.S. PATENT DOCUMENTS 4,978,317 A 12/1990 Pocrass
5,382,182 A 1/1995 Shen et al.
5,387,135 A 2/1995 Shen et al.
5,613,873 A 3/1997 Bell, Jr.
5,769,647 A 6/1998 Tulley et al.
D397,323 S 8/1998 Tulley et al.

OTHER PUBLICATIONS

Code of Federal Regulations, FCC Rules and Regulations, Part 68, pp. 339–406, no date.

*Primary Examiner*—Javaid H. Nasri
(74) *Attorney, Agent, or Firm*—Fenwick & West LLP

(57) ABSTRACT

An improved socket connector has flexible interior barriers to prevent incorrect insertion of smaller sized plugs, where a flexible internal barrier is formed on a side of the socket entry leading into the socket cavity, and is composed of a flexible ramp attached from the socket entry, the ramp extending into the socket cavity and having a inner movable end with a vertical barrier, sized and disposed within the socket cavity so that the insertion of a correctly sized wide plug will engage the flexible ramp, riding along and moving the flexible ramp so that the vertical barrier is moved out of a stopping position, allowing the correctly sized wide plug to be fully and properly seated in the cavity, but further sized and disposed within the socket cavity so that the insertion of an incorrectly sized narrow plug will fail to engage the ramp, will not flex the ramp, and will leave the vertical barrier in the stopping position, where it prevents the incorrectly sized narrow plug from being fully inserted into the socket cavity. The improved socket can be an RJ45 network socket, the correctly sized wide plug can be an RJ45 network plug, and the incorrectly sized narrow plug can be an RJ11 telephone plug.

8 Claims, 2 Drawing Sheets

SOCKET CONNECTOR HAVING A FLEXIBLE INTERNAL BARRIER TO PREVENT INCORRECT INSERTION OF SMALLER SIZED PLUGS

Matter enclosed in heavy brackets [ ] appears in the original patent but forms no part of this reissue specification; matter printed in italics indicates the additions made by reissue.

FIELD OF THE INVENTION

This invention relates to an electrical socket connector designed to prevent the improper insertion of smaller sized plug connectors.

BACKGROUND OF THE INVENTION

Today, telephone and communication connections of many kinds are commonly made using molded plastic modular connectors in standard shapes and sizes. Quite often there is a "family" of connectors having a similar shape, but with different sizes, widths or numbers of electrical contacts. While a larger or wider plug connector cannot be incorrectly inserted into a smaller or narrower socket, the reverse is not always true. A smaller or narrower plug connector can often be incorrectly inserted into a larger or wider socket, and the expected connection and functioning will not occur, and electrical or mechanical damage may occur. What is desired is an electrical socket connector designed to prevent the improper insertion of smaller sized plug connectors.

SUMMARY OF THE INVENTION

This invention provides an electrical socket connector having a flexible internal barrier designed to prevent the improper insertion of smaller sized plug connectors. In a preferred form, two flexible internal barriers are used, one on each side of the socket entry leading into the socket cavity. A flexible internal barrier is composed of a flexible ramp fixedly attached at the socket entry which extends a movable end into the socket cavity. The movable end is attached to a vertical barrier, which moves with the inner end of the flexible ramp. The insertion of a correctly sized wide plug will engage the sides of the plug with the flexible ramp, riding along and moving the flexible ramp so that the vertical barrier is moved out of its stopping position, allowing the plug to pass the vertical barrier and to be fully and properly seated in the cavity. The insertion of a incorrectly sized narrow plug will fail to engage and move the flexible ramp, leaving the vertical barrier in its stopping position, and preventing the narrow plug from being inserted into the socket cavity past the vertical barrier. In particular, this invention can be used to provide an improved RJ45 network socket which prevents the incorrect insertion of a smaller sized RJ11 telephone plug.

DETAILED DESCRIPTION OF A PREFERRED EMBODIMENT

Today, most telephones, and telephone-related equipment such as answering machines and modems, provide for connection to the standard telephone network through a 4 pin socket known as an RJ11 socket. The connection is made by the consumer with a short jumper cable of unshielded wire terminated at each end with a 4 pin molded plastic RJ11 plug. The characteristics of these RJ11 plugs and sockets are described in Subpart F of the Federal Communications Commission Rules and Regulations Part 68.500. The RJ11 has 6 contact positions, but usually only 4 connecting pins are used. These RJ11 plugs will be called "telephone" plugs.

Figure 1:
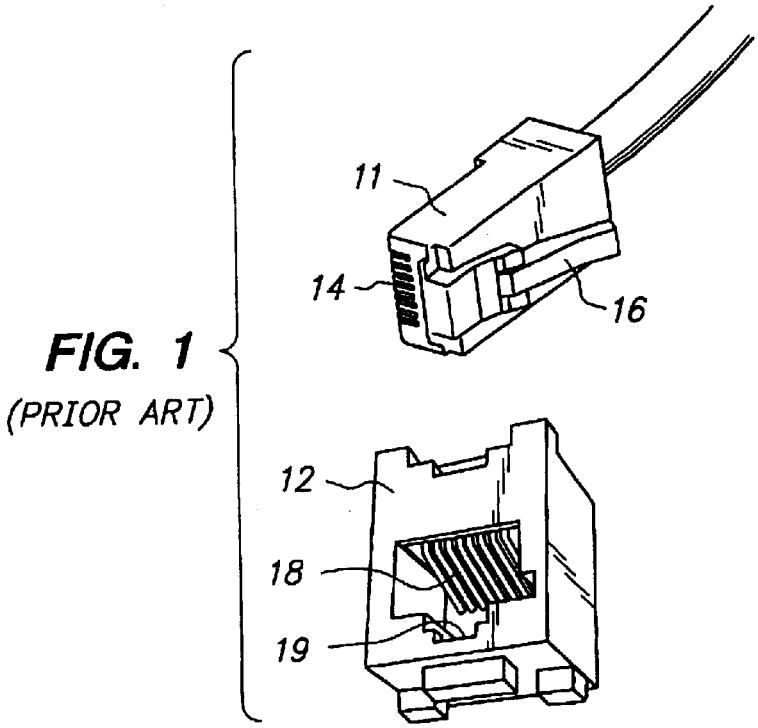
FIG. 1 (PRIOR ART)
FIG. 1 provides a perspective view of a standard RJ45 8 pin plug and socket.

Also today, many computer systems provide for connection to a local area network through an 8 pin socket known as an RJ45 socket. The connection is made by the computer owner or their network administrator with a short jumper cable of unshielded wire terminated at each end with an 8 pin molded plastic RJ45 plug. FIG. 1 provides a perspective view of a standard RJ45 8 pin plug and socket. The RJ45 has 8 contact positions, and connecting pins are usually used in all 8 positions. The specific characteristics of these RJ45 plugs and sockets are described in the IEEE Specification 802.3 for networking over unshielded twisted pair wire, known as 10BASE-T and 100BASE-T, and in the EIA/TIA-568B RJ-45 Wiring Scheme. These RJ45 sockets will be called "network" sockets.

Referring to FIG. 1 for the identification numerals, an RJ45 plug 11 is commonly made of clear molded plastic, with a row of metal contacts 14 on the top side, and a flexible plastic tab 16, also known as the "plug latching bar", on the bottom side. In practice, the top and bottom orientations can be varied, but will be used consistently in this specification.

Referring again to FIG. 1, an RJ45 socket 12 is commonly designed to be exposed on the outer enclosure surface of the telephone or computer equipment, and is usually made of molded plastic, with a cavity having within it a row of metal electrical contacts 18 on a top side, and a notch 19 for receiving the flexible plastic tab 16 of a plug 11 on the bottom side. The engagement of the flexible plastic tab 16 with the notch 19 aligns the plug 11 with the socket 12 and allows it to latch into place. The user can depress the flexible plastic tab 16 to release the plug 11 from the socket 12.

The RJ11 telephone plugs and sockets are slightly narrower than the RJ45 network plugs and sockets. A common mistake is for a computer user to insert a narrow RJ11 telephone plug into the wider RJ45 network socket. The plug may appear to properly match due to a similar shape and outline, the small friction between the parts, and the flexible plastic tab may become latched into place. However, a close examination would reveal that the narrow RJ11 plug is only loosely held within the wider RJ45 socket. The 4 pin RJ11 and 8 pin RJ45 electrical contacts will not properly match, and the expected network or telephone functions will not work. Indeed, equipment damage may occur as incorrect electrical contacts or short circuits are intermittently made, or if bending of the contact pins occurs as the narrow plug is shifted or skewed in its improper socket. For example, when an RJ11 plug is put into an RJ45 socket, the two edge contacts on the socket are bent out of the way by the plastic edges of the RJ11. This can lead to the contacts becoming permanently deformed, so that they will no longer make good contact with an RJ45 plug. A user who damages their RJ45 socket in this way may later try to use a proper RJ45 plug, but find that the connection is incomplete or unreliable, and that the networking functions will not operate.

While clear marking and labeling of the plugs and sockets can reduce these problems, what is desired is an RJ45 socket which prevents the improper insertion of the smaller RJ11 plug.

Figure 2:
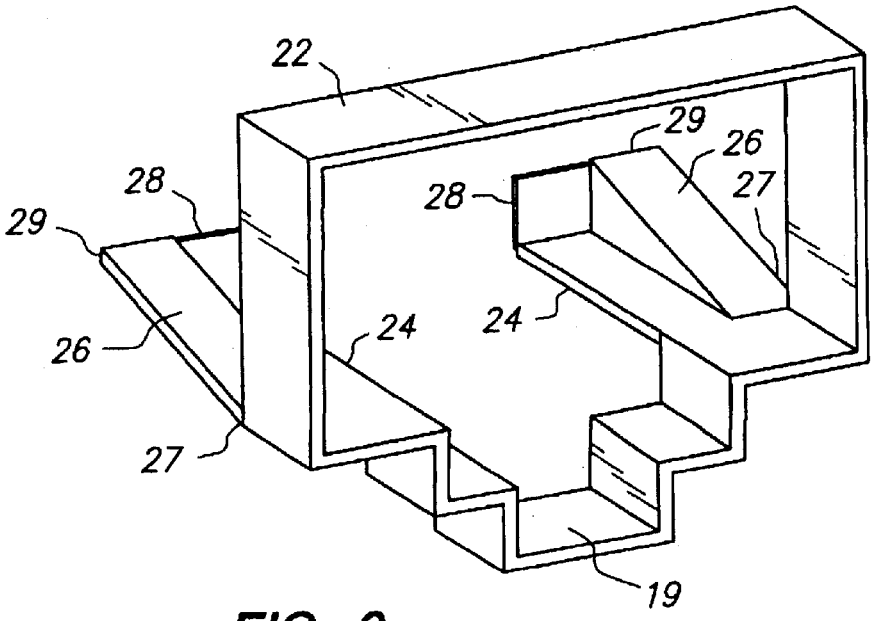
FIG. 2 provides a perspective view of the doorway or entry frame leading into the socket cavity of an improved socket connector having a flexible internal barrier to prevent incorrect insertion of smaller sized plugs in accordance with this invention.

FIG. 2 provides a perspective view of the doorway or entry frame leading into the socket cavity of an improved socket connector having a flexible internal barrier to prevent incorrect insertion of smaller sized plugs in accordance with this invention.

The doorway or entry frame 22 would be exposed on the outer enclosure surface of the equipment, and would provide the opening through which a plug would be inserted into a socket cavity behind the entry frame 22. The entry frame 22 provides an opening in a shape to match the appropriate plug, including a notch 19 for receiving the flexible plastic tab of a plug. Other socket details such as the back of the socket cavity, contact pins, mounting tabs, and electrical connections are eliminated from FIG. 2 in order to highlight the specific inventive features. The remainder of the socket is constructed or assembled using known industry standard techniques which will not be fully discussed here.

The inventive feature of the flexible internal barrier can be built onto the interior cavity walls, or as in this described preferred embodiment, onto the entry frame 22. The use of the entry frame 22 allows the invention can be more easily applied to current socket designs, or the invention can be incorporated into a new socket design with minimal changes to the other conventional socket parts.

In a preferred form, two flexible internal barriers 24 are used, one on each side of the entry frame 22 leading into the socket cavity. A flexible internal barrier 24 is composed of a flexible ramp 26 having a fixed end 27 and a movable end 29. The fixed end 27 is fixedly attached at the entry frame 22. The movable end 29 extends into the socket cavity. Attached to the movable end 29 is a vertical barrier 28, which moves with the movable end 29 of the flexible ramp 26. When the flexible ramp 26 is not flexed, the vertical barrier 28 remains in a central stopping position within the cavity which would prevent a plug from moving past it further into the socket cavity.

Figure 3:
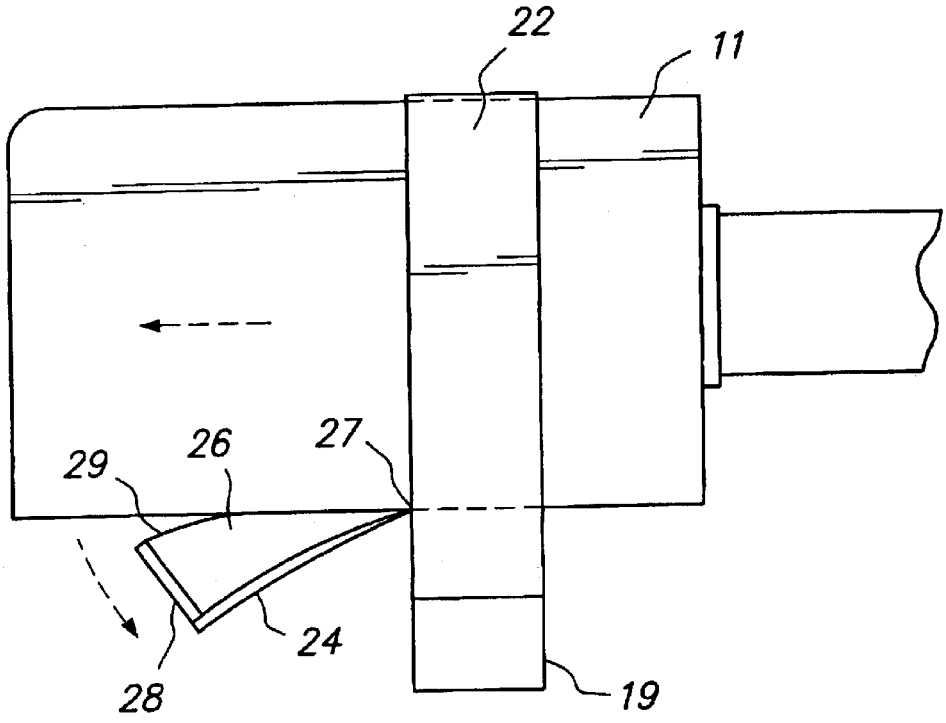
FIG. 3 provides a side view of the doorway or entry frame for an improved socket connector having a flexible internal barrier to prevent incorrect insertion of smaller sized plugs in accordance with this invention.

FIG. 3 provides a side view of the doorway or entry frame 22 for an improved socket connector having a flexible internal barrier 24 to prevent incorrect insertion of smaller sized plugs in accordance with this invention. In FIG. 3, a plug 11 is shown inserted. The plug 11 engages the flexible ramp 24 which forces the movable end 29 and vertical barrier 28 downward out of the central stopping position previously shown. When the vertical barrier 28 is moved downward out of the central stopping position previously shown, the plug 11 can be moved past it further into the socket cavity.

Since the entry frame 22 the flexible internal barrier 24, the flexible ramp 26, and the vertical barrier 28 can be implemented simply in plastic molding, the additional manufacturing cost, if any, is small. The flexible ramp 26 can be molded with similar flexible characteristics to the flexible plastic tab 16 used on a plug.

In operation, the insertion of a correctly sized wide plug 11 will engage the flexible ramp 26, riding along and moving the flexible ramp 26 so that the vertical barrier 28 is moved downward out of the central stopping position, allowing the correctly sized wide plug 11 to be fully and properly seated in the cavity. For example, when an RJ45 network plug is inserted into such an improved RJ45 network socket, it is wide enough to reach the edges, so it presses against the ramps, bending the ramps and vertical barriers out of the way so that the plug can go all the way into the socket cavity and lock into place properly.

Conversely, the insertion of a incorrectly sized narrow plug will fail to engage the ramps, will not move the ramps, and will leave the vertical barriers in the central stopping positions, where they prevent the incorrectly sized narrow plug from being fully inserted into the socket cavity. For example, when an RJ11 telephone plug is inserted into such an improved RJ45 network socket, the plug is too narrow to reach the edges, will not engage or move the ramps, and the vertical barriers will remain in the central stopping positions, which will prevent the narrow RJ11 telephone plug from going further into the RJ45 network socket cavity.

With this improved RJ45 network socket, the narrow RJ11 telephone plug will still go part of the way into the socket before it is blocked by the vertical barriers, but it will not go nearly far enough to lock into place, and will tend to fall out as soon as the user lets go of it, giving the user a clear indication that something is not correct. This should prompt most users to look a little more closely at what they are doing, and notice that they may be trying an incorrect plug and socket combination. Carefully designed, the length of the flexible ramp to the vertical barrier can be short enough that a narrow plug will be stopped only a few millimeters into the socket, which will reliably prevent incorrect insertions, incorrect electrical contact, or mechanical damage to the socket contacts.

Other variations will be apparent to one skilled in the art from a consideration of the preceding description. For example, the improvement could be used with other modular connectors which have large and small size connectors which can be incorrectly matched. The flexible internal barrier can be formed entirely across one side of the entry frame, entirely across a side of the socket cavity, or used on multiple sides of either. The flexible ramp could be formed of a beam, crossbar, or tab disposed so as to be engaged and flexed by the insertion of a correctly sized plug. It is intended that the scope of the invention should be limited only as set forth in the claims which follow.

What is claimed is:

1. A socket connector having a flexible interior barrier to prevent insertion of a small sized plug, the socket connector having a socket entry and a socket cavity for receiving a large sized plug, the flexible internal barrier comprising:

a flexible ramp having a fixed end and a movable end, the fixed end is attached to the socket entry, and the movable end which extends into the socket cavity;

a vertical barrier attached to the movable end, which moves with the movable end of the flexible ramp, the vertical barrier being in a central stopping position within the cavity when the large sized plug is not inserted and the flexible ramp is not moved, and the vertical barrier being moved away from the central stopping position within the cavity when the large sized plug is inserted which engages and moves the flexible ramp.

2. The socket connector as in claim 1, wherein the socket is an RJ45 network socket, the large sized plug is an RJ45 network plug and the small sized plug is an RJ11 telephone plug.

3. A socket connector having a flexible interior barrier to prevent insertion of a narrow plug, the socket having a socket entry and a socket cavity for receiving a wide plug, the flexible internal barrier comprising;

at two opposite sides of the socket cavity, a flexible ramp having a fixed end and a movable end, the fixed end attached at the entry and the movable end which extends into the socket cavity, the movable end further having a vertical barrier which moves with the movable end of the flexible ramp, the flexible ramp and vertical barrier configured such that the insertion of the wide plug will engage a side of the plug with the flexible ramp, riding along and moving the flexible ramp so that the vertical barrier is moved out of a stopping position, and allowing the wide plug to pass the vertical barrier and to be fully seated in the socket cavity, but further configured such that the insertion of the narrow plug will fail to engage a side of the plug with the flexible ramp, leaving the vertical barrier in its stopping position, and preventing the narrow plug from being further inserted into the socket cavity past the vertical barrier.

4. The socket connector as in claim 3, wherein the socket connector is an RJ45 network socket, the wide plug is an RJ45 network plug, and the narrow plug is an RJ11 telephone plug.

*5. A socket connector having a flexible interior barrier to prevent insertion of a small sized plug, the socket connector having a socket entry and a socket cavity for receiving a large sized plug, the flexible internal barrier comprising:*

*a flexible ramp having a fixed end and a movable end, the fixed end is attached to the socket entry, and the movable end which extends into the socket cavity;*

*a barrier attached to the movable end, which moves with the movable end of the flexible ramp, the barrier being in a central stopping position within the cavity when the large sized plug is not inserted and the flexible ramp is not moved, and the barrier being moved away from the central stopping position within the cavity when the large sized plug is inserted which engages and moves the flexible ramp.*

*6. The socket connector as in claim 5, where the socket is an RJ45 network socket, the large sized plug is an RJ45 network plug and the small sized plug is an RJ11 telephone plug.*

*7. A socket connector having a flexible interior barrier to prevent insertion of a narrow plug, the socket having a socket entry and a socket cavity for receiving a wide plug, the flexible internal barrier comprising:*

*at two opposite sides of the socket cavity, a flexible ramp having a fixed end and a movable end, the fixed end attached at the entry and the movable end which extends into the socket cavity, the movable end further having a barrier which moves with the movable end of the flexible ramp, the flexible ramp and barrier configured such that the insertion of the wide plug will engage a side of the plug with the flexible ramp, riding along and moving the flexible ramp so that the barrier is moved out of a stopping position, and allowing the wide plug to pass the barrier and to be fully seated in the socket cavity, but further configured such that the insertion of the narrow plug will fail to engage a side of the plug with the flexible ramp, leaving the barrier in its stopping position, and preventing the narrow plug from being further inserted into the socket cavity past the barrier.*

*8. The socket connector as in claim 7, where the socket connector is an RJ45 network socket, the wide plug is an RJ45 network plug, and the narrow plug is an RJ11 telephone plug.*

* * * * *